(12) United States Patent  
Mimar (10) Patent No.: US 7,793,084 B1
(45) Date of Patent: Sep. 7, 2010

(54) EFFICIENT HANDLING OF VECTOR HIGH-LEVEL LANGUAGE CONDITIONAL CONSTRUCTS IN A SIMD PROCESSOR

(76) Inventor: Tibet Mimar, 1040 Gloucester Ct., Sunnyvale, CA (US) 94087

( * ) Notice: Subject to any disclaimer, the term of this patent is extended or adjusted under 35 U.S.C. 154(b) by 1796 days.

(21) Appl. No.: 10/441,336

(22) Filed: May 20, 2003

Related U.S. Application Data (60) Provisional application No. 60/397,669, filed on Jul. 22, 2002.

(51) Int. Cl.
 *G06F 7/38* (2006.01)
 *G06F 9/00* (2006.01)
 *G06F 9/44* (2006.01)
 *G06F 15/00* (2006.01)

(52) U.S. Cl. ...................................... 712/236
(58) Field of Classification Search .................... 712/2, 712/236
 See application file for complete search history.

(56) References Cited

U.S. PATENT DOCUMENTS

| | | | |
|---|---|---|---|
| 4,712,175 A | 12/1987 | Torii et al. | |
| 4,862,407 A | 8/1989 | Fette et al. | |
| 5,511,210 A | 4/1996 | Nishikawa et al. | |
| 5,513,366 A | 4/1996 | Agarwal et al. | |
| 5,555,428 A | 9/1996 | Radigan et al. | |
| 5,802,384 A | 9/1998 | Nakamura | |
| 5,832,290 A | 11/1998 | Gostin et al. | |
| 5,838,984 A | 11/1998 | Nguyen et al. | |
| 5,864,703 A | 1/1999 | van Hook et al. | |
| 5,872,987 A | 2/1999 | Wade et al. | |
| 5,887,183 A | 3/1999 | Agarwal et al. | |
| 5,903,769 A | 5/1999 | Arya | |
| 5,940,625 A | 8/1999 | Smith | |
| 5,973,705 A | 10/1999 | Narayanaswami | |
| 5,991,531 A | 11/1999 | Song et al. | |
| 5,991,865 A | 11/1999 | Longhenry et al. | |
| 5,996,057 A | 11/1999 | Scales et al. | |
| 6,058,465 A | 5/2000 | Nguyen | |
| 6,530,015 B1 | 3/2003 | Wilson | |
| 6,665,790 B1 | 12/2003 | Glossner, III et al. | |
| 6,959,378 B2 | 10/2005 | Nickolls et al. | |

(Continued)

OTHER PUBLICATIONS

Paar et al.; A Novel Predication Scheme for a SIMD System-on-Chip; 2002.*

(Continued)

*Primary Examiner*—Eddie P Chan
*Assistant Examiner*—Corey Faherty
(74) *Attorney, Agent, or Firm*—Sawyer Law Group, P.C.

(57) ABSTRACT

The present invention provides an efficient method to implement nested if-then-else conditional statements in a SIMD processor, which requires only one vector compare instruction for both if and else parts of the conditional construct. No stack and stack-handling instructions are needed for vector condition codes. Two condition code flag bits representing if and else parts of testing per element provide for nesting of multiple if-then-else. All SIMD instructions are conditional including the vector compare instruction, and this provides a method for aggregating multiple conditions in nested if-then-else statements. M full levels of if-then-else nesting requires $(2^M-1)$ nodes or vector test instructions and $2^{M+1}$ condition code flags per vector element. Also, capability to compare any element of first source vector register with any element of second source vector is provided.

24 Claims, 7 Drawing Sheets

U.S. PATENT DOCUMENTS

| | | | |
|---|---|---|---|
| 6,963,341 | B1 | 11/2005 | Mimar |
| 7,159,100 | B2 | 1/2007 | Van Hook et al. |
| 7,191,317 | B1 * | 3/2007 | Wilson ........................ 712/224 |
| 7,308,559 | B2 | 12/2007 | Glossner et al. |
| 7,376,812 | B1 | 5/2008 | Sanghavi et al. |
| 7,467,288 | B2 | 12/2008 | Glossner et al. |
| 7,546,443 | B2 | 6/2009 | Van Hook et al. |
| 2002/0198911 | A1 | 12/2002 | Blomgren et al. |
| 2003/0014457 | A1 | 1/2003 | Desai et al. |
| 2005/0071411 | A1 | 3/2005 | Gustavson et al. |

OTHER PUBLICATIONS

Anido et al.; A Novel Method for Improving the Operation Autonomy of SIMD Processing Elements; 2002; IEEE.*

" White Gaussian Noise Generator (Communication)", Reference Design Library, Xlinx System Generator v6.3 User Guide, 2004, 3 Pages.

Klimasauskas, Casimir C., "Not Knowing Your Random Number Generator Could Be Costly: Random Generators - Why Are They Important", PCAI (PC Artificial Intelligence), vol. 16.3, 2002, pp. 52-58.

Altivec Technology Programming Environment Manual, Altivecperm/D, Nov. 1998, Rev.0. www.altivec.com. See Permute Instruction.

Imaging and Compression Engine (ICE), Silicon Graphics, http://futuretech.mirror.vuurwerk.net/ice.html.

Altivec Instruction Cross Reference: http://developer.apple.com/hardware/ve/instruction_crossref.html.

Intel SSE Instruction Set: http://www.tommesani.com/SSEPrimer.html.

" The Complete Guide to MMX Technology", Intel, McGraw-Hill, Inc.; ISBN 0-07-006192-0, 1997, pp. 2-21.

AltiVec Technology Programming Interface Manual, Freescale Semiconductor, Jun. 1999, Rev. 0.

Ian Mapleson, " O2 Architecture", Dec. 4, 2007.

"Intel 64 and IA-32 Architectures Software Developer's Manual", vol. 2B: Instruction Set Reference, N-Z, Dec. 2009, pp. 4-236 through 4-250.

"Power PC Microprocessor Family: Vector/SIMD Multimedia Extension Technology Programming Environments Manual", version 2.06, Aug. 22, 2005, pp. 244-249.

Donald E. Knuth, "The Art of Computer Programming", vol. 3, Sorting and Searching, Second Edition, 1998, Addison-Wesley, p. 221.

Altivec Instruction Cross Reference: http://developer.apple.com/hardware/ve/instruction_crossref.html, 2008.

SSE Primer: http://www.tommesani.com/SSEPrimer.html, 2000.

* cited by examiner

| "Cond" Field | VCF Bit # | Notes | Summary |
|---|---|---|---|
| c0i | 0 | Group-0 IF Condition | VCMP[Test].Cond instruction generates a pair of condition flags and writes into a specified group, one of the 0-6 groups (Group-d)<br><br>Any conditional vector instruction could select any one of the 16 condition flags of VCF specified by "Cond". |
| c0e | 1 | Group-0 ELSE Condition | |
| c1i | 2 | Group-1 IF Condition | |
| c1e | 3 | Group-1 ELSE Condition | |
| c2i | 4 | Group-2 IF Condition | |
| c2e | 5 | Group-2 ELSE Condition | |
| c3i | 6 | Group-3 IF Condition | |
| c3e | 7 | Group-3 ELSE Condition | |
| c4i | 8 | Group-4 IF Condition | |
| c4e | 9 | Group-4 ELSE Condition | |
| c5i | 10 | Group-5 IF Condition | |
| c5e | 11 | Group-5 ELSE Condition | |
| c6i | 12 | Group-6 IF Condition | |
| c6e | 13 | Group-6 ELSE Condition | |
| F | 14 | Hard Coded as "False". | |
| T | 15 | Hard Coded as "True". Default if "Cond" is omitted. | |
| Table: Condition Codes Opcode Field Syntax and Assignment | | | |

EFFICIENT HANDLING OF VECTOR HIGH-LEVEL LANGUAGE CONDITIONAL CONSTRUCTS IN A SIMD PROCESSOR

CROSS REFERENCE TO RELATED APPLICATION

This application claims priority under 35 U.S.C 119(e) from co-pending U.S. Provisional Application No. 60/397,669 filed on Jul. 22, 2002 by Tibet Mimar entitled "Method for Efficient Handling of Vector High-Level Language Conditional Constructs in a SIMD Processor", the subject matter of which is fully incorporated herein by reference.

BACKGROUND OF THE INVENTION

1. Field of the Invention

The invention relates generally to the field of processor chips and specifically to the field of single-instruction multiple-data (SIMD) processors. More particularly, the present invention relates to conditional and nested vector operations in a SIMD processor.

2. Description of the Background Art

In a scalar processor when conditional operations such as if-then-else high-level language constructs are implemented, the operation may simply be implemented by changing flow of the program execution to skip over instructions for which the tested condition is false. For example, if we have the following code sequence:

Instruction 1: if (X>Y)

Instruction 2: A=B+C;

Instruction 3: else

Instruction 4: A=(B−C)/2;

In instruction 1 if X-greater-than-Y condition is true, then instruction 2 is executed, and a branch or jump instruction is used to skip over instruction 4. Alternatively, if X greater than Y condition is false, the instruction 2 is skipped over and program execution continues with instruction 3.

However, in a vector processor there are multiple elements in a vector, and hence when we compare two vectors, the tested condition could be true for certain elements and false for other elements. Since all elements are operated on by the same SIMD instruction, the instruction execution flow of the processor may not be modified as it is done in a scalar processor. Furthermore, even if program flow could be changed, this would be costly in time, because each branch instruction typically takes 3 or more cycles to execute.

Intel's SSE and MMX handle this by using compare-and-set mask instruction. This instruction sets all bits of an element to 1s if condition corresponding to that element position is true, and to all zeros otherwise. This mask and its generated inverse have to be logically ANDed with a number, which can then be used to implement conditional vector operations. For example, Intel SSE has four 32-bit elements in a 128-bit vector. Let us suppose we wanted to compare each of the four values in a XMM register to zero:

| C Instruction 1: | if (xmm [i] > 0) |
| C Instruction 2: | xmm [i] = xmm [i] + 1; |
| C Instruction 3: | else |
| C Instruction 4: | xmm [i] = xmm [i] − 1; |

Intel's assembly equivalent shown below uses SIMD compare and logical operations without any branching.

| Assembly Instruction 1: | movaps | xmm3, [one] |
| Assembly Instruction 2: | movaps | xmm4, [minusone] |
| Assembly Instruction 3: | movaps | xmm0, [convert] |
| Assembly Instruction 4: | movaps | xmm1, xmm0 |
| Assembly Instruction 5: | cmpltps | xmm1, [zero] |
| Assembly Instruction 6: | andps | xmm4, xmm0; |
| Assembly Instruction 7: | andnps | xmm0, xmm3; |
| Assembly Instruction 8: | addps | xmm1, xmm4; |
| Assembly Instruction 9: | addps | xmm1, xmm0; |

The following explains the above assembly code.

| Assembly Instruction 1: | Loads four copies of 1 into xmm3 |
| Assembly Instruction 2: | Loads four copies of −1 into xmm4 |
| Assembly Instruction 3: | Loads four input values into xmm0. |
| Assembly Instruction 4: | Since xmm0 is overwritten, it is saved into xmm1. |
| Assembly Instruction 5: | Compares four values of xmm0 with zero. Values greater than zero are changed to mask of zero. Values less than zero changed to mask of all ones. |
| Assembly Instruction 6: | "−1" → Elements that are set to ones. |
| Assembly Instruction 7: | "+1" → Elements that are set to ones. |
| Assembly Instruction 8: | Adds −1 to certain elements. |
| Assembly Instruction 9: | Adds +1 to certain elements. |

The disadvantage of this approach is that it takes a lot of vector instructions to implement, and also has no provision for handling nested vector if-then-else constructs. Several vector registers has to be used to save all the conditions, and therefore, it is likely that there will not be enough vector registers, and some has to be loaded from memory. Overall, due to the overhead of many instructions the performance is degraded significantly.

Spielman used a stack to store condition flags. Each processor element has an enable value and history values stored on stack, and stack and state handling instructions are used to retrieve the status of element enables in nested conditional constructs. Inversion of condition is also required for the else portion. This is an improvement over the Intel's approach, but still requires many instructions and is not optimal. Our present invention requires only one vector compare instruction for both if and else parts of the conditional construct, and no stack and stack-handling instructions are needed. Furthermore, only small number of bits is required in instruction opcode to enable conditional vector instruction execution.

SUMMARY OF THE INVENTION

The present invention provides an efficient way to implement nested conditional constructs in a SIMD processor, where processing performance and low-cost are very important for consumer video applications such as Digital TV. Typically, a scalar processor calculate multiple condition flags, such as Zero, Negative, Carry, etc., using a compare or test instruction, and then a conditional branch instruction tests a certain combination of these condition flags for skipping over certain instructions. The present invention directly calculates the condition that is tested by a high-level if-else construct. This aggregated condition flags for each vector element is stored in a vector condition flag (VCF) vector register for both "if" and "else" legs of the conditional testing.

The condition flags for each if and else legs of conditions are vectors, where each bit represents condition for one vector element.

Each vector instruction is defined as conditional and has a field to choose one of the previously calculated condition code flags from the VCF register. This implements multiple nested levels of vector if-then-else constructs without any stacks or retesting of the condition. The vector-compare test instruction itself is also conditional to aggregate multiple levels of conditions. The above requires 4 bits in instruction opcode for three full levels of nesting using only seven vector compare instructions beside the data crunching vector instructions. The VCF flags for each vector element for three full levels of nested if-then-else constructs are contained in 16-bits, which are grouped as eight groups of two bits, where the two bits represent condition code flags for if and else legs. The performance is improved due to minimal overhead and it is easy to map high level constructs to this. Furthermore, mapping high-level constructs to vector assembly becomes a simple matter.

In addition to the traditional greater, less-then, etc., used for comparison, the present invention also incorporates a vector comparison for comparing two values to be plus or minus delta range of each other. The delta number is supplied by a control vector or global register. Performing such thresholding operations are common in video processing and other signal processing algorithms.

The present invention also minimizes number of control bits required in vector instruction opcode. For example, three full nested levels require only 4 condition select bits in vector instruction opcode.

BRIEF DESCRIPTION OF THE DRAWINGS

The accompanying drawings, which are incorporated and form a part of this specification, illustrated prior art and embodiments of the invention, and together with the description, serve to explain the principles of the invention.

DETAILED DESCRIPTION

In the following detailed description of the present invention, numerous specific details are set forth in order to provide a thorough understanding of the present invention. However, it will be obvious to one skilled on the art that the present invention may be practiced without these specific details. In other instances well-known methods, procedures, components, and circuits have not been described in detail so as not to unnecessarily obscure aspects of the present invention.

The present invention features an efficient method for implementing nested if-then-else high-level language constructs in a single-instruction multiple-data (SIMD) computer system that executes on a vector of N elements for each SIMD instruction. The preferred embodiment performs 16 SIMD operations in a processor having 256-bit wide data memory that is organized as 16 modules of on-chip memory, where each memory module is 16-bits wide. Although a data path of 256-bits and 16-vector elements is exemplified herein, the present invention is readily adaptable to other variations with different N values other than 16.

To handle M full levels of conditional if-then-else nesting, vector Condition Flag (VCF) register contains $2^{M+1}$ bits per vector element to store vector conditions. SIMD instruction opcode requires M+1 bit condition select field, including always true and always false cases. The condition logic takes the VCF flags for given element and condition select bits from the SIMD opcode and generates an enable or disable signal for that element. If enabled, the operation defined by the SIMD instruction takes affect; otherwise, it is as if no-operation occurred for that element, and output element, if any, is left unchanged. The condition logic is repeated for each element of SIMD processor.

VCF contains $2^{M+1}$ condition flags per element, or $2^{M+1}*N$ bits in total for a N-wide SIMD. Two of the condition flags for each element are hard wired such that one of them is always true, and the other one is always false. These two hardwired conditions provide for always true, i.e., non-conditional, and always false, i.e., no-operation (NOP). In the preferred embodiment, VCF register is 256 bits, and contains 16 16-bit condition flags for each vector element position. For each of these vector element positions, bit #0 is wired to one, and bit #1 is wired to zero directly. The Vector Compare Instruction (VCMP) sets the other fourteen bits. These fourteen bits are grouped as seven groups of two bits. One of these two bits correspond to the condition for the "if" part and the other one corresponds to the "else" condition that is calculated by VCMP instruction. In a three full levels of nesting, these seven groups of two bits represent conditions for the 7 nodes where comparison operations are performed (see FIG. 5).

VCMP instruction has the following formats:

| | |
|---|---|
| VCMP[Test].[Cond] | Group-d, Vs-1, Vs-2 |
| VCMP[Test].[Cond] | Group-d, Vs-1, Vs-2[element] |
| VCMP[Test].[Cond] | Group-d, Vs-1, Vs-2, VC |

The first format compares respective vector elements of Vs-1 and Vs-2, which is the typical operation of pairing vector elements of two source vectors. The second format compares one element (selected by element number) of Vs-2 across all elements of Vs-1. In prior art such a vector mode of operation is referred to as "broadcast" mode. The third format compares any element of Vs-1 with any element of Vs-2, where the user-defined pairing of elements is determined by vector control register VC elements. Based on the assembly syntax, one of the above three formats are chosen and this is coded by format field of instruction opcode.

Where:

Test Selects one of the conditions to calculate such as Greater-Than (GT), Equal (EQ), Greater-Then-or-Equal (GE), Less-Than (LT), Less-Then-or-Equal (LE), Delta (DLT), etc, and Generates a single one-bit condition flag for "if" condition (condition true) and one-bit condition flag for "else" (condition false) condition. Such calculation of final single-bit condition flags for a complex target condition such as greater-than-or-equal-to is referred to as aggregation of test condition into a single condition flag herein. These conditions could be signed or unsigned depending upon application requirements. For video processing, it is usually sufficient to define only signed compares. If delta condition is selected, then the following condition is checked:

$$Vs\text{-}2 - delta <= Vs\text{-}1 <= Vs\text{-}2 + delta$$

Where the value of delta for each vector element is provided by VC vector register. The preferred embodiment of VCMP instruction has 6 variants, and these are: VCMPGT, VCMPGE, VCMPEQ, VCMPLT, VCMPLE, and VCMPDLT. These are coded as part of the overall 6-bit vector instruction opcode field, i.e., as six different vector instructions.

Cond Since VCMP itself is also conditional, as the other vector instructions, this field selects one of the $2^{M+1}$ conditions to be logically AND'ed with calculated condition flags for each vector element by VCMP instruction. This is referred to as compounding of condition flags herein. This field has (M+1) bits. If there is no parent condition, or "Cond" field is left out in assembly syntax of an instruction, then this field selects hardwired always-true condition.

Group-d This field selects one of the $(2^M-1)$ groups as the destination of this vector instruction. Each group contains two condition bits calculated by the VCMP instruction, one for the "if" branch, and one for the "else" branch. The possible values for this pair of binary numbers is (1,0), (0,1), and (0,0), where the last one corresponds to the case where the parent branch condition is false. This field uses M bits, and hardwired (1,0) pair is reserved for always-true and always-false conditions. For example, for the above-mentioned embodiment with 16 vector elements, and 16-bits per vector element of VCF, we have 7 possible if-else destination groups in VCF for each vector element position, settable by VCMP instruction, and $8^{th}$ group is the hardwired (1,0) lair.

Vs-1 Vector Source register # 1 to be used in testing.

Vs-2 Vector Source register # 2 to be used for testing.

VC Mapping control vector register. Also, referred to as Vs-3 or Vector Source register # 3. Defines the element-to-element mapping to be used for vector comparison. In other words, the comparison, may not be between corresponding elements, but may have arbitrary cross mapping. If no VC is used in assembly coding and delta condition is not selected, this defaults to one-to-one mapping vector elements. For the preferred embodiment, the bits of VC are defined as follows:

Bits 4:0: Vector mapping for source-1 vector register;
Bits 9-5: Vector mapping for source-2 vector register;
Bits 14:10: Delta value (unsigned);
Bit 15: Disable mask. When set to one, disables updating of selected condition flag group for a given element.

VCMP Element i of Vs-2 is subtracted from element j of Vs-1 based on the mapping defined by VC, and according to the test condition specified, and two condition flags of selected condition group is set to one or zero in accordance with test field defining a comparison test to be performed, parent condition flag selected by "Cond" field, and mask bit and mapping control defined by control vector VC. Elements of source vector registers #1 and #2 are mapped as defined by VC vector register before the subtract or delta operation.

Element Defines one of the elements for comparing a selected element of source vector #2 with all elements of source vector #1.

The operation of VCMP[Test] instruction is defined below in C-type pseudo code: for (i=0; i<16; i++) if (VC(i)$_{15}$==0 || format !=0) //Each element condition enabled if mask bit is 0.
{
Group=2*Group-d;
Case (Format)
{
0: map source 1=VC[i]$_{4\ldots0}$;
    map source 2=VC[i]$_{9\ldots5}$;
    break;
1: map source 1=i;
    map source 2=Element;
    break;
default:
    map source 1=i;
    map source 2=i;
    break;
}
source 2=Vs-2[map source 2]; //Mapping of Source-1 based on VC element bits 9-5.
source 1=Vs-1[map source 1]; //Mapping of Source-2 based on VC element bits 4-0.
parent condition=Cond[i];
delta=[VC[i]$_{14\ldots10}$] //Delta for each vector element is from bits 14-10 of VC.

case (Test)
{
GT:
    Condition←(Source 1-Source 2)>0;
    VCR [i]$_{Group}$←Condition & Parent condition;
    VCR [i]$_{Group+1}$←!Condition & Parent condition;
    break;
GE:
    Condition←(Source 1-Source 2)>=0;
    VCR [i]$_{Group}$←Condition & Parent condition;
    VCR [i]$_{Group+1}$←!Condition & parent condition;
    break;
LT:
    Condition←(Source 1-Source 2)<0;
    VCR [i]$_{Group}$←Condition & parent condition;
    VCR [i]$_{Group+1}$←!Condition & parent condition;
    break;
LE:
    Condition←(Source 1-Source 2)<0;
    VCR [i]$_{Group}$←Condition & Parent condition;
    VCR [i]$_{Group+1}$←!Condition & Parent condition;
    break;
EQ:
    Condition←(Source 1-Source 2)==0;
    VCR [i]$_{Group}$←Condition & Parent condition;
    VCR [i]$_{Group+1}$←! Condition & parent condition;
    break;
NE:
    Condition←(Source 1-Source 2) !=0;
    VCR [i]$_{Group}$←Condition & parent condition;
    VCR [i]$_{Group+1}$←! Condition & parent condition;
    break;

DLT:
  Condition←abs(Source 1-Source 2)<=delta; //Delta Test
  VCR [i]$_{Group}$←Condition & Parent condition;
  VCR [i]$_{Group+1}$←!Condition & Parent condition;
  break;
   }
 }

Where "!" signifies logical inversion, and "&" signifies logical AND operation, and "abs" signifies absolute-value operation.

For example, to implement a single level of if-then-else is as follows:

| Pseudo C-Code | Pseudo Vector Assembly Code |
|---|---|
| if (x > y) | VCMPGT c2, Vs1, Vs2 |
| { | |
| Operation_1; | V[Operation-1].c2i <Operands> |
| Operation_2; | V[Operation-2].c2i <Operands> |
| } | |
| else | |
| { | |
| Operation_3; | V[Operation-3].c2e <Operands> |
| Operation_4; | V[Operation-4].c2e <Operands> |
| } | |

We omitted condition code field on VCMPGT, which then defaults to non-conditional execution. Here we assume that operands are already loaded in vector registers. VS-1 contains x and VS-2 contains y value. This shows that actually there is less vector assembly instructions that C-level instructions. The preferred embodiment of present invention uses a dual-issue processor, where a tightly coupled RISC processor handles all loading and storing of vector registers. Therefore, it is reasonable to assume that vector values are already loaded in vector registers.

Figure 4:
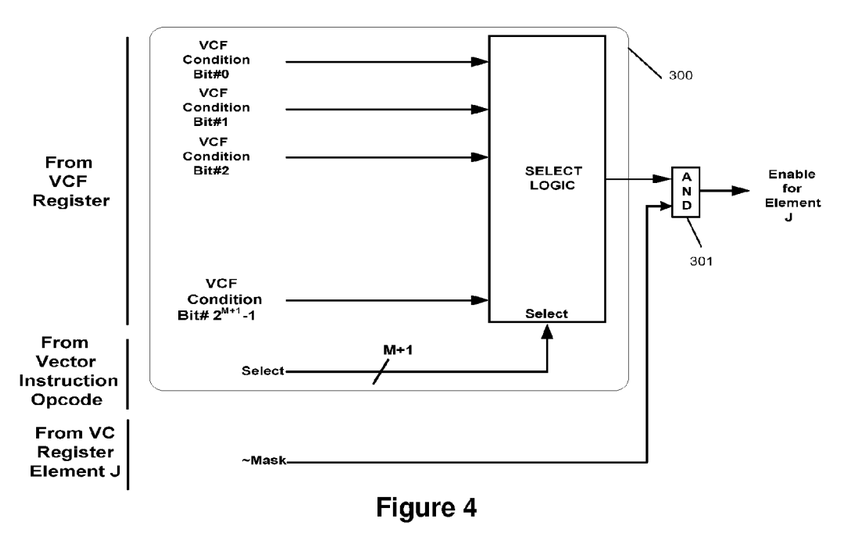
FIG. 4 shows the inside of condition logic of FIG. 3 and VCF assembly field syntax and bit assignment example. This logic is simply a select function. The select logic is a mux that simply selects one of the inputs based on the select input from opcode.

In the above table, "c2" defines the group of Condition-2, which is nothing but one of the $2^{M+1}$ condition flags. The "c2i" defines the "if" part of the vector condition, and "c2e" defines the "else" part condition two group. This is to facilitate readability; otherwise number field of [M:0] could, as it is coded in the instruction opcode, and c2i and c2e correspond to numbers 2 and 3 in preferred embodiment (see FIG. 4 Table).

Figure 1:
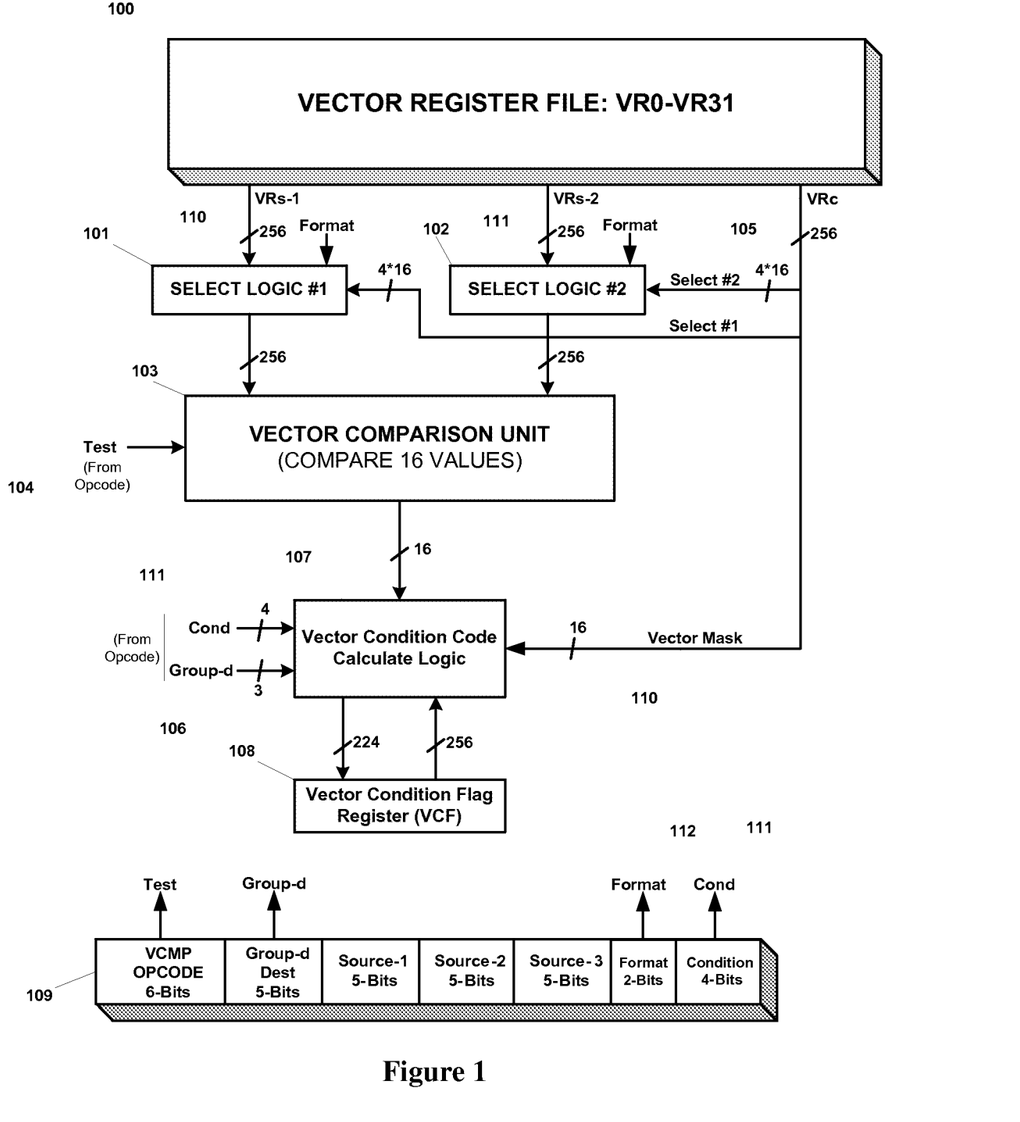
FIG. 1 shows block diagram vector comparison operation (VCMP[Test] instruction) of the present invention.

FIG. 1 shows the operation of VCMP instruction. Two source vector elements are read from ports VRs-1 110 and VRs-2 111 of vector register file 100. In this embodiment, we have 16 vector elements, each with 16-bit signed two's complement resolution. Concurrently, control vector elements are read from port VRc 105 of vector register file 100. The vector elements of source vector #1 are passed through Select Logic #1 101, which optionally maps the source #1 elements, where in output of select logic any element could be sourced from any input element, including an element could be mapped to multiple vector element positions. Similarly, the vector elements of source vector #2 are mapped by Select Logic #2 102. Both select logic mappings are controlled by the vector elements of control vector read from VRc port 105. The details of the select logic 101 and 102, are identical and shown in FIG. 2. These select logic could either pass the vector sources unchanged (shown as "respective elements" in Table), one element of source vector #2 selected for all output elements (shown as Broadcast mode in Table) or perform general mapping of vector elements (shown as Any-Element to Any-Element in Table). In any-element to any-element mode, certain bit-fields of vector control register (defined by VC in assembly syntax) that is read from port VRc determines the mapping as defined above. VRc[J]$_{(i+4)...i}$ refers to bit field of bit # (i+4) to bit # i, inclusive, of element J of vector VRc.

Figure 2:
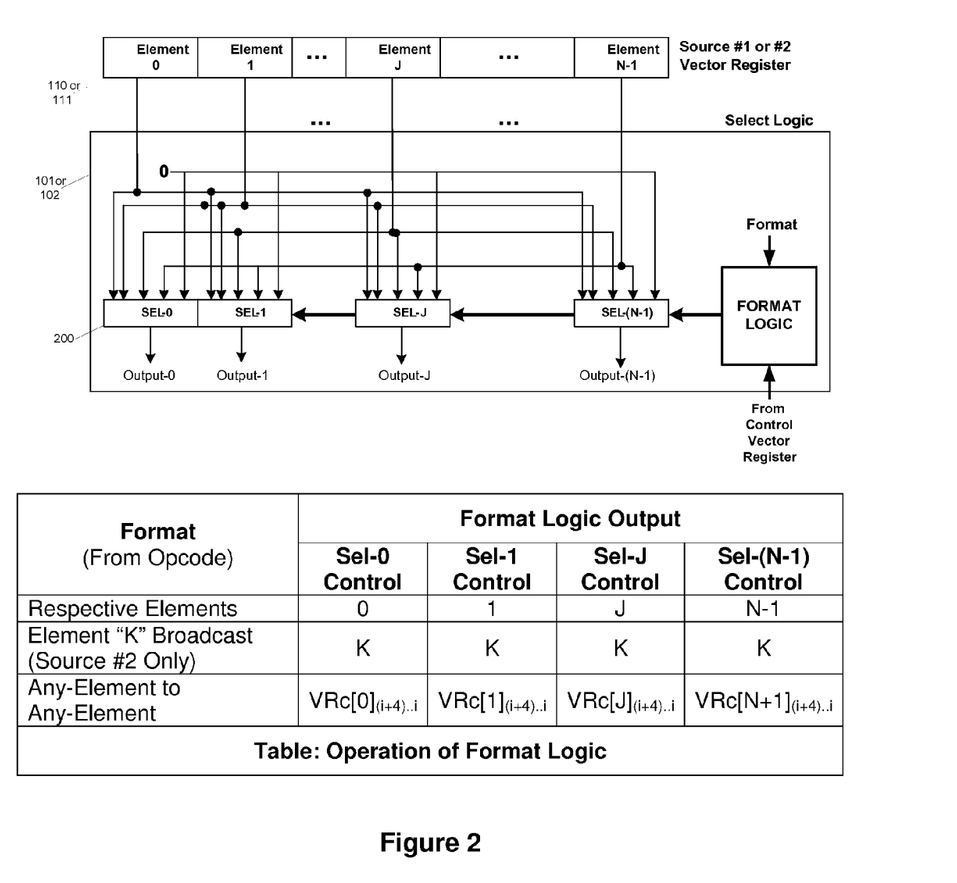
FIG. 2 shows details of the select logic and table showing different ways of pairing first and second source vector elements.

Each selector is a simple 1-of-(N+1) logic 200. These select logic 101 and 102 provide optional ability to compare any element of source vector #1 with any element of source vector #2 without the need to shuffle vector element positions. The outputs of the select logic is coupled to Vector Comparison Unit 103, which subtracts respective 16 vector elements of output select logic #2 from respective 16 vector elements of output select logic #1, and performs the desired compare operation specified by Test field 104 of vector opcode 109. The output of vector comparator is 16 condition flags, which is coupled to Vector Condition Code Calculate Logic 107. This block 107 reads the Vector Condition Flag (VCF) register 108, selects a parent condition by "Cond" field 111 of VCMP instruction, logically AND's currently calculated conditions with previously calculated parent condition, and updates the Group-d for both "if" and "else" condition flags, if respective vector mask 110 is false. Such logical AND operation of parent test condition and current test conditions is referred to as compounding of condition from different levels of testing.

Figure 3:
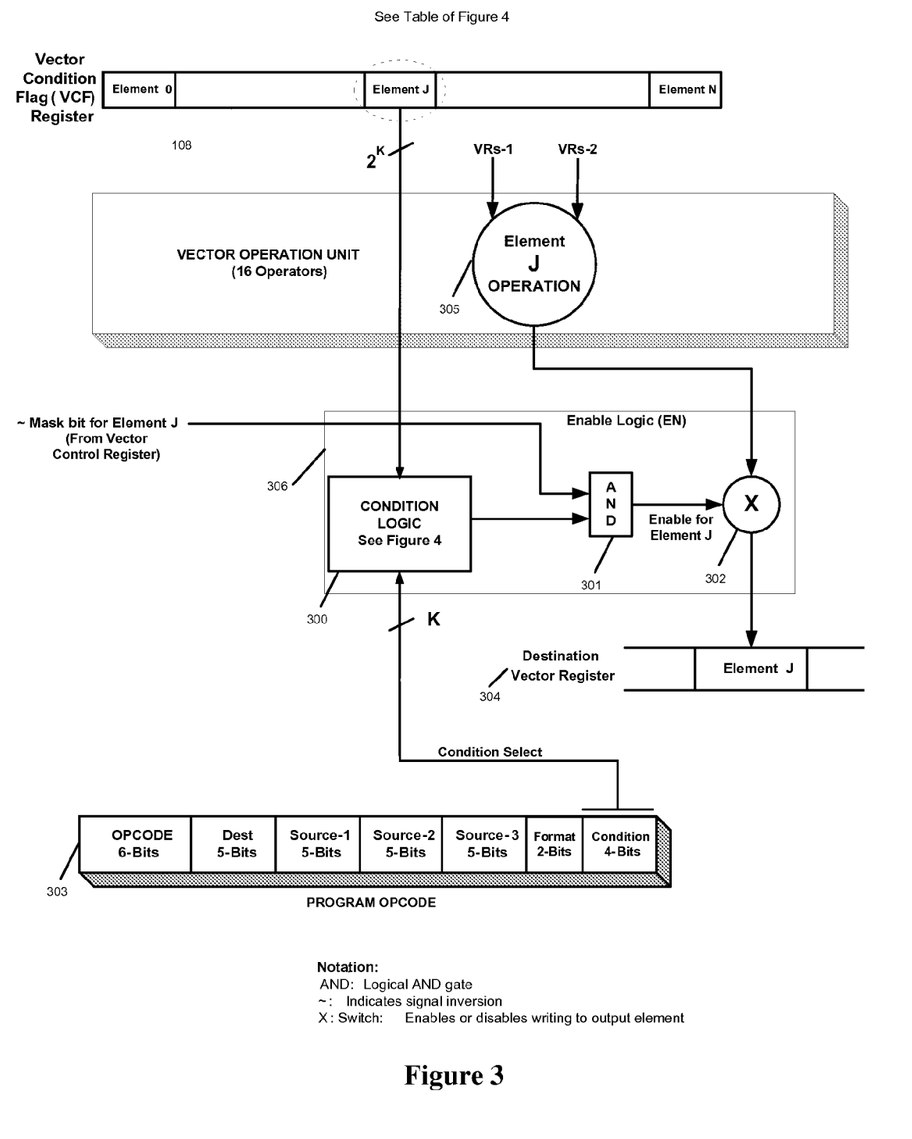
FIG. 3 shows block diagram of vector operation and the connection of Vector Conditional Flag Register, vector instruction opcode, and the vector conditional enable logic.

FIG. 3 illustrate conditional execution of instructions or vector operations on a vector element basis. SIMD instruction opcode 303 specifies which of the $2^{M+1}$ condition flags to choose from the VCF register 108 by Condition Logic 300, and if the selected condition is true and mask bit is not set for a given vector element, as determined by AND logic 301, then vector operation 305 for that element is executed. Otherwise, output for that element remains unchanged. Enable for element J controls the switch 302 which controls the write to destination vector register 304.

Figure 5:
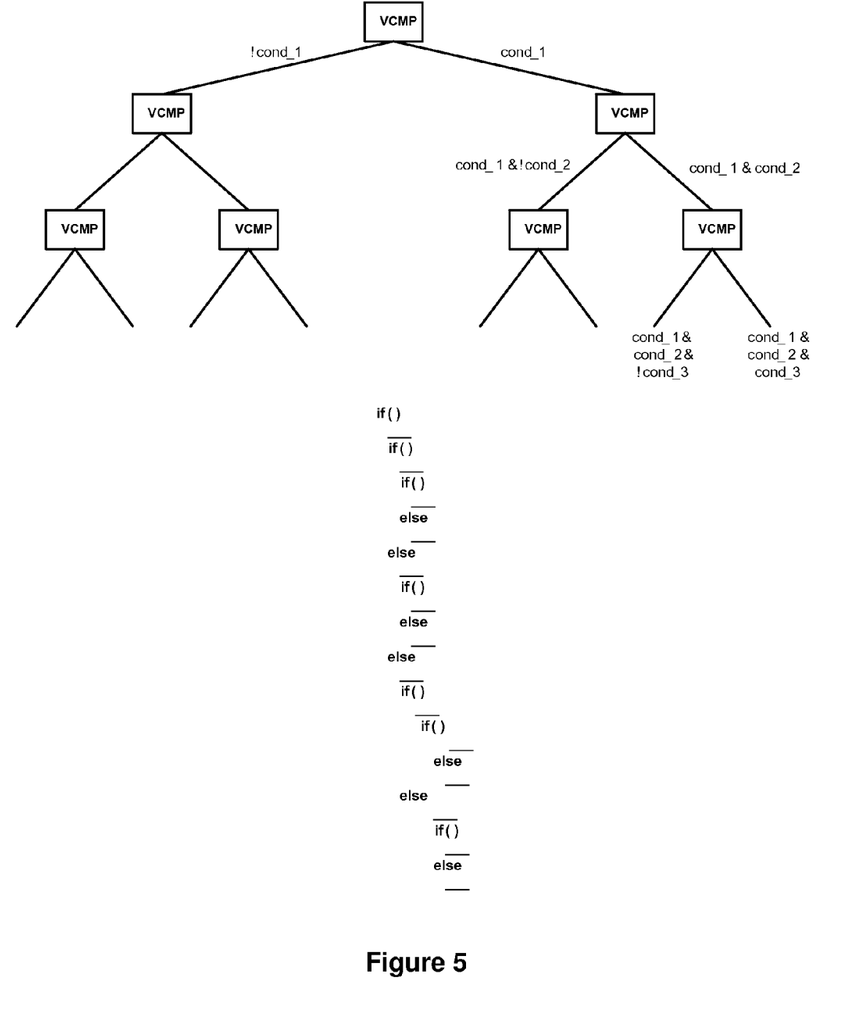
FIG. 5 illustrates the three full levels of if-then-else nesting. Each node of the binary tree represents a vector if-then-else statement, where both "if" and "else" parts of the high-level language are mapped to variants of the vector compare instruction (VCMP). This instruction calculates condition flags for both legs of the if-then-else.

M full levels of nested if-then-else statements will require $2^M-1$ compare instructions, as shown in FIG. 5, where logical negation is indicated by "!" and "&" indicates logical AND operation. This means we have to store $2^{M+1}-2$ condition flags. For the preferred embodiment, three full nested levels require 14 condition code flags, and the other two flags are permanently tied to one and zero.

For example, let us assume we have the following C-code where operands are vectors:

Instruction 1: if (x>y)

Instruction 2: if (x==0) a=b+1;

Instruction 3: else a=b-1;

Instruction 4: else a=b-c;

To simply the example, let us further assume each vector has four elements and we have the following values for x and y:

x={4, 1, 9, 0} y={14, 0, 32, -7}

Then, the instruction 1 will generate the following condition code flags:

If-Branch: {0, 1, 0, 1}

Else-Branch: {1, 0, 1, 0}

Instruction 2 will generate the following condition codes:

If-Branch: {0, 0, 0, 1} & {0, 1, 0, 1}={0, 0, 0, 1}

Else-Branch: {1, 1, 1, 0} & (0, 1, 0, 1}={0, 1, 0, 0}

Since instruction 2 is conditionally executed, only the vector elements where the instruction 1 condition true is executed for the testing of instruction 2. Only one of the four elements passes the combination of previous level and current test for the both "if". Similarly, only one other element passes the if-condition of instruction 1 and the else-condition of instruction 2. These would be translated to the following vector assembly instructions:

| | | |
|---|---|---|
| Instruction 1: VCMPGT | _c2, Vx, Vy | // x > y ? |
| Instruction 2: VCMPGT.c2i | _c3, Vx, Vzero | // x > 0 ? |
| Instruction 3: VADD.c3i | _Va, Vb, Vone | // A = B + 1 |
| Instruction 4: VSUB.c3e | _Va, Vb, Vminus1 | // A = B − 1 |
| Instruction 5: VSUB.c2e | _Va, Vb, Vc | // A = B − C |

Instruction 1: Sets condition group 2, which is bits 2 and 3 of VCF for each vector element. Since no condition is specified, the assembler chooses the always-true VCF condition flag for instruction opcode.

Instruction 2: Uses condition from group 2, one of the two bits that is defined to correspond to the if-condition. This vector compare also sets group 3, which are bits 4 and 5 of VCF for each vector element.

Instruction 3: Executes vector add operation for the elements with c3$i$ condition bit is set. Other elements of destination remain unchanged.

Instruction 4: Executes vector subtract operation for the elements with c3$e$ condition bit is set. Other elements of destination remain unchanged.

Instruction 5: Executes vector subtract operation for the elements with c2$e$ condition bit is set. Other elements of destination remain unchanged.

Vector compare instruction of present invention also provides ability for parallel sorting and acceleration of data sorting algorithms in conjunction with a vector multiplex instruction by a factor of over N times over scalar methods for a N-wide SIMD embodiment. Vector multiplex (VMUX) instruction uses the same basic structure of SIMD processor but has only one source vector (see FIG. 6), which overlays with FIG. 1, but one of the select logic, 101, is used to map elements of a source vector to a destination vector elements based on the user-defined mapping of a vector control register read from VRc port 105 and vector condition flag register 102 and mask bit dependency. VMUX instruction reads a specified source vector register from vector register file 100 port VRs-1 110, and control vector register from port VRc 105 in substantially at the same time. The select logic 101 maps the VRs-1 vector elements based on the mapping provided by VRc.

Figure 6:
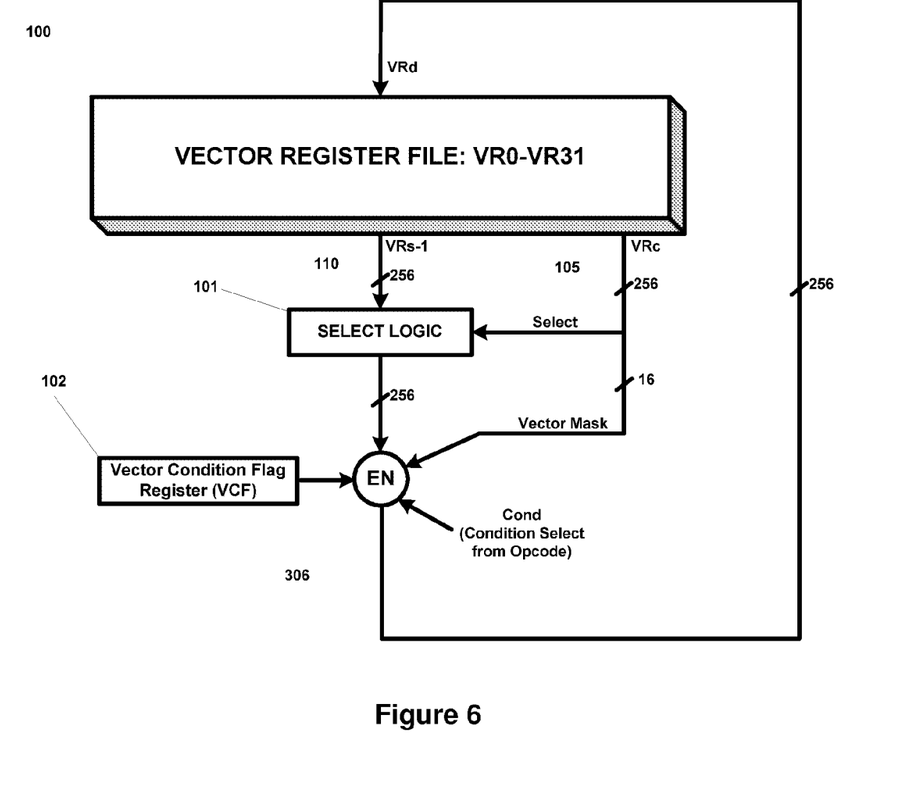
FIG. 6 shows block diagram of VMUX vector instruction operation.

The output of select logic is connected to a enable-logic (EN) 306 (detailed in FIG. 3) which conditionally stores the output elements of select logic output based on selected condition flag and mask bit for each vector element position. The condition flags are provided by a vector condition flag register 102. The mapping of a source vector elements to a destination vector elements are performed in parallel in substantially one pipelined clock cycle.

VMUX mapping instruction uses a source-vector register (VRs), a mapping control vector register (VRc), and destination vector register (VRd), as:

VMUX.[Cond] VRd, VRs, VRc

Where "[Cond]" specifies the condition code, selecting one of the condition flags for each element of VCF register, if the mapping is to be enabled based on each element's condition code flags. If condition code flags are not used, then the condition "True" may be used, or simply omitted.

Each element of the control vector register also includes a mask bit, which selectively disables storing the mapping result, for a given element, in each corresponding destination vector register element position. We could assign the location of bit fields within control elements, to specify mapping and the mask bit in multiple ways, but in one embodiment using 16-bit elements and 16 elements per vector, the following control vector element specification is used:

Bits 4 to 0: Mapping Field: Indicates which numbered input element of the source vector register is mapped to the destination vector register element.

Bits: 14 to 5: Unused.

Bit 15: Mask: When set to one, this bit disables write-back of the mapping result in the corresponding destination vector register element.

Figure 7:
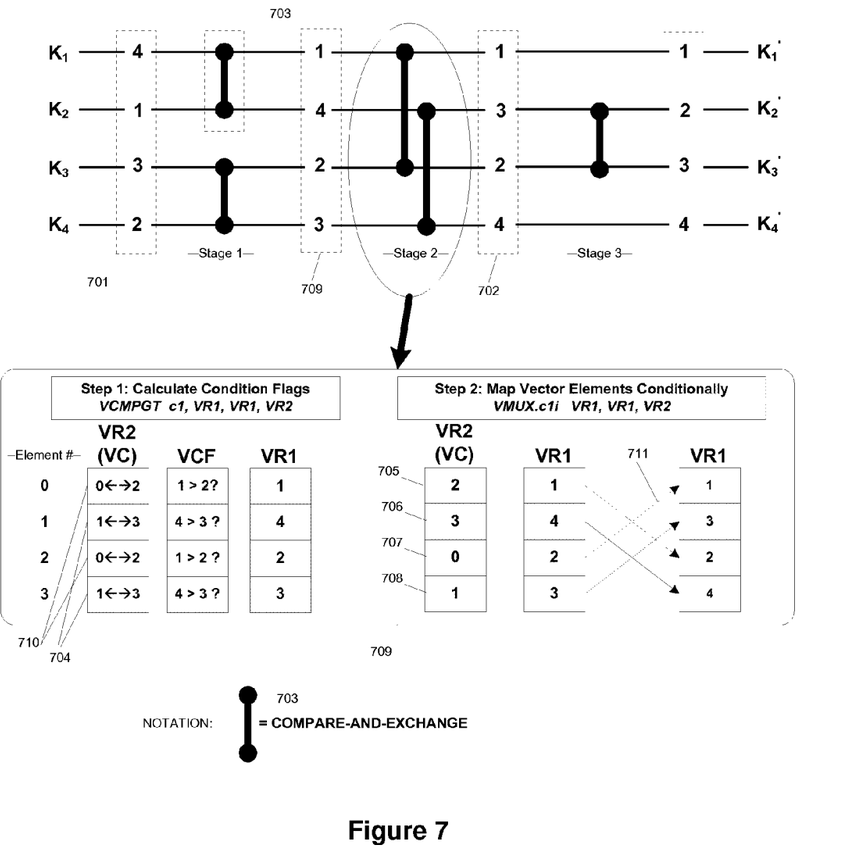
FIG. 7 shows an example data sorting example using select any-element-to-any-element comparison feature of the present invention.

An example of vector comparison and conditional mapping for ordering the elements of an 4-element vector is shown in FIG. 7, where a three stage algorithm (Donald Knuth, *Sorting and Searching*, p. 221, Addison Wesley, 1998) with input vector of {4, 1, 3, 2} 701. Here numbers enter at the left, and comparator modules are represented by vertical connections between two lines; each comparator module 703 causes an interchange of its inputs, if necessary, so that larger number sinks to the lower line after passing the comparator. Each stage of sorting could be performed with one VCMP and one VMUX instruction. The stage 2 has {1, 4, 2, 3} 709 input vector, where we compare elements 0 and 2 for two vector element positions 710, and 1 and 3 at two vector positions 704 and set the same condition flag in VCF. For VMUX instruction, VC is set so that element 0 of VR1 is sourced from element 2 at 707, element 1 is sourced from 3 at 708, element 2 is sourced from element 0 at 705, and element 3 is sourced from element 1 at 706. The dashed lines 711 indicate data moves that was not performed because corresponding condition code flags were false. The resultant vector is {1, 3, 2, 4} 702.

This example shows that sequence of 4 numbers could be sorted into ascending or descending order in 6 vector instructions of the present inventions: 3 stages×(1 VCMP+1 VMUX) per stage. Since the example embodiment used is a 16-wide SIMD, this means four sets of 4 four numbers could be concurrently sorted out in parallel. Scalar implementation would require 8, 8, and 4 compare and exchange operations for stages 1, 2 and 3, respectively. Assuming compare-and-exchange requires 3 instructions (compare-branch-and-exchange), the total instructions is 60. This means an acceleration by a factor of over 60/6, or 10×, but actual acceleration is much higher since each branch instruction of scalar compare requires multiple clock cycles.

I claim:

1. An execution unit for use in a computer system for conditionally performing a vector operation defined in a computer instruction, the execution unit comprising:

first and second input vector registers for holding respective first and second source vector operands on which said vector operation defined in the instruction is to be carried out, wherein each of said first and second input vector registers holds a plurality of vector elements of a predetermined size, each vector element defining one of a plurality of vector element positions;

a vector condition flag register for storing a plurality of condition flags for each of said plurality of vector element positions, each element of said plurality of condition flags defining a true or false condition value;

means for loading said first and second input vector registers;

a plurality of operators associated respectively with said plurality of vector element positions for carrying out said vector operation on respective vector elements of said first source vector operand and said second source vector operand;

a vector compare unit for comparing said first and second source vector operands in accordance with a test field defined in the instruction, and generating a test condition flag for each of said plurality of vector element positions;

a vector condition code calculate logic that compounds said test condition flag with a prior generated condition flag of said vector condition flag register to generate a resultant condition flag for each of said plurality of vector element positions, said prior generated condition flag selected in accordance with a condition field defined in the instruction;

means to store said resultant condition flag into a destination condition flag of said vector condition flag register for each of said plurality of vector element positions, said destination condition flag selected in accordance with destination field defined in the instruction; and means for storing the output of said vector operation to a destination vector register in accordance with said prior generated condition flag of each respective vector element of said vector condition flag register on a vector element-by-element basis.

2. The execution unit according to claim 1, wherein said vector condition code calculate logic generates a pair of condition code flags corresponding to IF and ELSE branches of a if-else comparison, and stores said pair of condition code flags into a destination flag pair of said vector condition flag register for each of said plurality of vector element positions.

3. The execution unit according to claim 1, wherein results of said vector operation is written to said destination vector register in accordance with a mask bit in addition to said prior generated condition flag for each of said plurality of vector element positions.

4. The execution unit according to claim 1, further including:

means for mapping said first source vector operands;
means for mapping said second source vector elements;
a control vector for controlling mapping of said first and second source vector operands;
said vector compare unit inputs are operably coupled to said mapped first source vector operands and said mapped second source vector operands; and
whereby said vector compare unit compares, for each of said plurality of vector element positions, respective elements of said mapped first source vector operands and said mapped second source vector operands, in accordance with said test field defined in the instruction.

5. The execution unit according to claim 4, wherein said mask bit is part of each element of said control vector register, and update of said destination condition flag is enabled when respective said mask bit is false.

6. The execution unit according to claim 4, wherein three instruction formats are supported in pairing elements of said first and second source vector operands: respective said first and second source vector operands element-to-element format as default, said second source vector operand one-element broadcast format, and said first and second source vector operands any-element-to-any-element format requiring said control vector as third source vector operand.

7. The execution unit according to claim 1, wherein comparison tests defined by said test field include: greater-than, greater-than-or-equal-to, less-than, less-than-or-equal-to, and equal.

8. The execution unit according to claim 1, wherein comparison tests defined by said test field include a delta test.

9. The execution unit according to claim 1, wherein one of said plurality of condition flags of said vector condition flag register is hardwired to always-true, and one of said plurality of condition flags of said vector condition flag register is hardwired to always-false for each of said plurality of vector element positions.

10. A method for a vector comparison of a first source vector and a second source vector, and providing a conditional vector operation, each vector comprising at least first and second vector elements, the method comprising:

storing said first source vector;
storing said second source vector;
comparing elements of said stored first source vector and said stored second source vector for a selected comparison test and calculating a test condition flag for each vector element position;
accessing stored condition values derived from the results of executing a prior instruction sequence and selecting a condition flag from a plurality of condition flags for each vector element position;
calculating a resultant condition flag by compounding said calculated test condition flag with said selected condition flag;
storing said resultant condition flag for said vector comparison into a selected destination condition flag of said plurality of condition flags; and
storing results of said conditional vector operation for arithmetic and logical vector operations to a destination vector in accordance to said selected condition flag value for each vector element position, said destination vector being the same size as said stored first source vector and said stored second source vector.

11. The method of claim 10, wherein calculating said resultant condition flag for both said calculated condition true and false cases of said vector comparison by compounding said calculated test condition flag with said selected condition flag, and inverse of said calculated test condition flag with said selected condition flag, respectively, and storing into two condition flags of said plurality of condition flags.

12. The method of claim 10, wherein output of said conditional vector operation is written to said destination vector in accordance with a mask bit and said selected condition flag.

13. The method of claim 10, further comprising:

storing a control vector;
selecting, in accordance with each vector element of said stored control vector, a respective one of the vector elements of said stored first source vector;
selecting, in accordance with each vector element of said stored control vector, a respective one of the vector elements of said stored second source vector;
means for performing said conditional vector operation or said vector comparison on said selected stored first source vector and said selected stored second source vector.

14. The method of claim 13, further comprising:

storing said mask bits as part of said stored control vector;
storing said resultant condition flag in accordance with said mask bit for each respective vector element position.

15. The method of claim 10, wherein said selected comparison tests include: greater-than, greater-than-or-equal-to, less-than, less-than-or-equal-to, equal.

16. The method of claim 10, wherein said selected comparison tests include a delta test.

17. The method of claim 10, wherein one of the condition flags of said plurality of condition flags for each vector element position is always true, and one of the condition flags of said plurality of condition flags for each vector element position is always false.

18. An apparatus for a comparison test of first and second source vectors, and for performing nested vector conditional operations, the apparatus comprising:
- a vector register file including a plurality of vector registers with a plurality of read data ports and at least one write data port, wherein said plurality of vector registers are accessed in parallel and substantially at the same time;
- a condition flag vector for storing a plurality of condition flags for each respective vector element;
- means for loading said plurality of vector registers of said vector register file with at least said first and second source vectors;
- means for performing said comparison test and compounding results of said comparison test with a selected condition flag of said condition flag vector;
- means for storing output of said vector comparison test into a destination condition flag of said condition flag vector for each vector element position;
- a vector operation unit including plurality of computing elements coupled to said plurality of read data ports of said vector register file for performing arithmetic or logical operations on the vector elements in parallel; and
- an enable logic coupled to write port of said vector register file for providing means for storing the output of said vector operation unit in a destination vector register in said vector register file on a vector element-by-element basis in accordance with said selected condition flag of said condition flag vector.

19. The apparatus of claim 18, wherein said comparison test calculates both IF and ELSE condition flag pair corresponding to if-else conditional construct and stores said condition flag pair into two said destination condition flags in said condition flag vector.

20. The apparatus of claim 18, wherein said enable logic operates in accordance with a mask bit for each vector element position in addition to said selected condition flag.

21. The apparatus of claim 18, further comprising:
- at least one control vector register;
- means for mapping first and second source vectors in accordance with said at least one control vector register values, and providing said mapped first source vector and said mapped second source vector as alternative inputs to said comparison test and said vector operation unit.

22. The apparatus of claim 18, wherein one of said plurality of condition flags is hardwired to always true for each respective element position.

23. The apparatus of claim 18, wherein list of possible said comparison tests include: greater-than, greater-than-or-equal-to, less-than, less-than-or-equal-to, equal.

24. The apparatus of claim 18, wherein list of possible said comparison tests include a delta test.

* * * * *